United States Patent [19]

Bowen et al.

[11] 4,168,838
[45] Sep. 25, 1979

[54] BULKHEAD FITTING

[75] Inventors: Robert F. Bowen, Burlington; Joseph R. Adamski, Brighton, both of Mass.

[73] Assignee: Raytheon Company, Lexington, Mass.

[21] Appl. No.: 935,405

[22] Filed: Aug. 21, 1978

[51] Int. Cl.² .................. F16J 15/06; F16L 25/00
[52] U.S. Cl. .................................. 277/125; 277/1;
  277/237 R; 285/161; 285/328
[58] Field of Search ............... 277/1, 34, 123, 125,
  277/4, 237 R, DIG. 6; 285/200, 161, DIG. 11,
  328

[56] References Cited

U.S. PATENT DOCUMENTS

| 1,030,306 | 6/1912 | Hull | 285/161 |
|---|---|---|---|
| 1,348,667 | 8/1920 | Snyder | 285/328 |
| 3,325,195 | 6/1967 | Margis | 285/328 X |
| 3,428,339 | 2/1969 | Haulik et al. | 285/328 X |
| 3,638,968 | 2/1972 | Barks | 285/328 X |
| 3,749,424 | 7/1973 | Greene | 285/161 |
| 4,042,248 | 8/1977 | Williamitis | 277/1 X |

FOREIGN PATENT DOCUMENTS 671673  10/1964  Italy ........................... 285/161

Primary Examiner—Robert S. Ward, Jr.
Attorney, Agent, or Firm—Harold A. Murphy; Joseph D. Pannone; John T. Meaney

[57] ABSTRACT

A bulkhead fitting for use with plastic material for conducting fluid through an aperture in the material and comprising coupling components on either side of the material which interfaces with the plastic material by an abrasive element pressed against the plastic material by an intermediate compressible member whereby leakage is prevented.

11 Claims, 3 Drawing Figures

U.S. Patent    Sep. 25, 1979    4,168,838
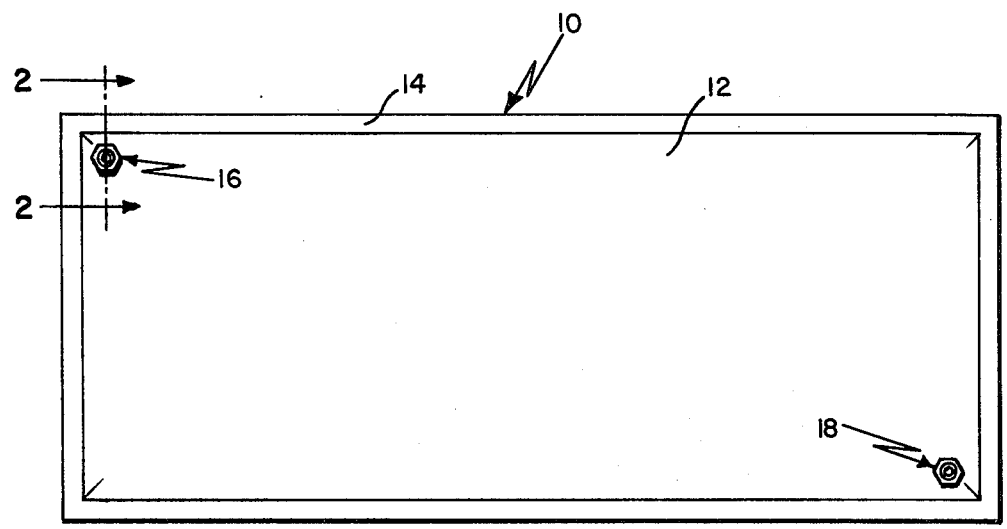
FIG. 1
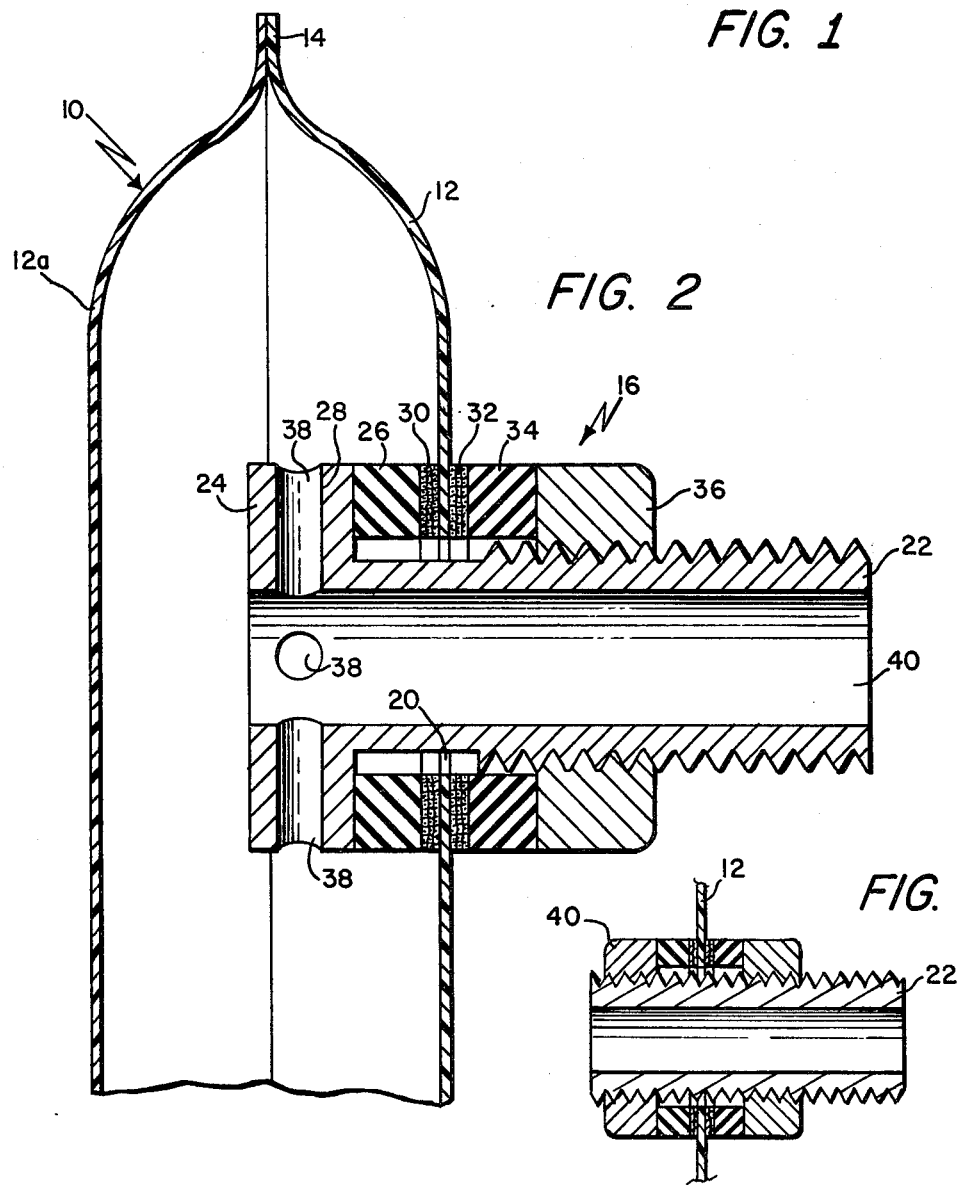
FIG. 2
FIG. 3

BULKHEAD FITTING

BACKGROUND OF THE INVENTION

In using certain types of plastic material for production of containers of various sorts intended for containing fluids such as water, an inherent problem is presented in the area of connection to such material for water flow in and out of the container. Such material as fluroethylenepolymer, for example, is often used as a bearing surface and has a very low coefficient of friction. Such material, often commercialized under the trade name Teflon, poses a serious problem when it is desired to secure a compression or gasketed type of fitting to the material. Such material is also structured for poor adhesion by various cements and epoxies which work well on other types of plastic materials.

It is important in the manufacture of plastic heat exchangers, for example, such as disclosed in U.S. patent application Ser. No. 925,025, filed July 17, 1978, and assigned to the same assignee as the present invention, that fluid such as water heated by solar energy be circulated through the heat exchanger and then returned to the collector system without fluid loss such as might be caused by leakage. It is obvious that leakage is highly undesirable and, therefore, the fitting means for coupling the water flow into and out of the heat exchanger must be such that leakage will not occur. It has been found that the most suitable plastic materials from which such conformable heat exchangers are formed are those with which conventional fittings can not be efficiently utilized.

SUMMARY OF THE INVENTION

The above and other disadvantages of the prior art are overcome in the present invention by the provision of a fitting which may be readily and efficiently attached to known plastic material suitable for the manufacture of fluid containers. Such a fitting, according to this invention, comprises a hollow shank which extends through an aperture in the plastic material, the shank provided with a head on one end to abut one side of the plastic material and being threaded to receive a nut on the side of the material opposite the head. Between the head and the adjacent side of the plastic material there is located an annular flexible or compressible member, such as rubber, which encircles the shank portion of the device in this area. A similar compressible annular member is disposed around the shank against the inner surface of the nut. Between each of the compressible members and the adjacent surface of the plastic material is a respective ring of abrasive material such as emery cloth or the like.

It will be apparent that in the structure described, tightening the nut on the threaded shank portion of the fitting will cause the two annular compressible members to be urged toward one another and, in doing so, to compress the abrasive members tightly against opposite sides of the flexible material.

It has been found that the abrasive elements will become slightly embedded in the surfaces of the plastic material as well as in the surfaces of the compressible annular members. This has been found to provide a slip-proof structure which results in an efficient leak-proof connection between the fitting and the plastic material which will remain in place and will not be subject to leakage.

BRIEF DESCRIPTION OF THE DRAWINGS

The above and other advantages of this invention will become apparent from the following description taken in connection with the accompanying drawing, wherein:

FIG. 1 is an elevational view of a plastic fluid container having bulkhead fittings constructed according to this invention;

FIG. 2 is an enlarged vertical sectional view taken substantially on line 2—2 of FIG. 1 looking in the direction of the arrows; and FIG. 3 is a reduced axial sectional view of a modified fitting embodying the invention.

DESCRIPTION OF THE PREFERRED EMBODIMENTS

Referring more particularly to the drawing, one example of a fluid container with which the fitting embodying the present invention may be used is illustrated in FIG. 1. The container 10 comprises a pair sheetlike members 12 and 12a of plastic material such as fluoroethylenepolymer, for example. The sheets 12 overlie one another and are heat-sealed together at their peripheries as indicated at 14. The plastic material for member 12 will preferably be a high material having high thermal capability such as the material known as Teflon and may be as thin, for example, as three to five mils.

At one corner is located an inlet fitting 16 and at an opposite corner is an outlet fitting 18, thus providing means whereby a fluid such as water may be circulated into, through and out of the container 10. The fittings 16 and 18 are shown as being located in plastic layer 12 but may be located in layer 12a, or one in each layer, if desired.

Referring more particularly to FIG. 2, the inlet fitting 16 only is illustrated, but it is to be understood that outlet fitting 18 is identical in structure. The plastic member 12 is apertured as indicated at 20 and a hollow shank portion 22 of a fitting embodying the invention projects through the aperture 20. The fitting is preferably formed of a rigid plastic or metal such as brass, for example. The shank 22 is provided with an integral head 24 preferably on its end which extends within the interior of the container 10.

Between the head 24 and the plastic member 12 is two-part structure which, in accordance with this invention, retains the inner portion of the fitting in efficient leak-preventing relation with the inner surface of the plastic member 12, a structure which will not allow the fitting to become easily disengaged from the plastic member even in cases where the plastic material of the member has a relatively low coefficient of friction.

The structure comprises an annular member 26 of compressible material such as natural or silicone rubber, for example. The compressible rubber ring 26 has one surface which abuts the adjacent under surface 28 of the head 24. The opposite surface of the member 26 is engaged by one surface of an annular gasket 30 of non-fluid soluble abrasive material, preferably emery cloth. On the opposite side of the plastic member 12 is a second similar structure encircling the shank 22 and comprising an emery cloth or similar non-fluid soluble annular abrasive gasket 32, one surface of which abuts the adjacent surface of the plastic member 12. A compressible ring 34 of rubber, similar to ring 26, reposes against the outer surface of the abrasive gasket 32 and is held thereagainst by a nut 36 which is threaded onto the shank 22. The gasket may be made of any nonsoluble fabric or thin wire mesh material impregnated with fine abrasive such as silica grit or carbide particles, for example, preferably supported in a suitable nonsoluble binder.

It will be apparent that by threading the nut 36 on shank 22 in a direction toward the head 24, the gaskets 30 and 32 will be forcibly urged into close engagement with the respective opposite surfaces of the plastic member 12 by the compressible rings 26 and 34. The abrasive gaskets 30 and 32 will become somewhat embedded in the surfaces of the member 12 as well as the surfaces of the compressible rings 26 and 34. This prevents accidental and undesirable displacement of the parts regardless of the low coefficient of expansion of the plastic material.

It will also be apparent that the fitting must be assembled with the plastic member 12 before the seal 14 is made except in cases where the plastic material is sufficiently stretchable to permit the aperture 20 to be expanded enough to permit the head 24 to be inserted.

In FIG. 2 the head 24 of the shank 22 is provided with one or more transverse apertures 38 so that if the second plastic member 12a should be moved against the head 24 in a manner such as to close the end of the bore 40 through the shank 22, circulation of fluid will still take place through the apertures 38.

The embodiment of the invention shown in FIG. 3 is similar to the FIG. 2 embodiment, but shows a second nut 40 threaded onto the inner end of the shank 22 instead of the fixed head 24 shown in FIG. 2. Thus, pressure upon the structure may be exerted on both sides of the plastic member 12. This modified device will preferably be used where only a single plastic member 12 is utilized unless additional means is provided to assume fluid flow through the central passageway 40 in the shank 22 in cases where one end of the passageway is inadvertently covered.

Either of the embodiments described above will provide a fitting which will be efficiently sealed to a slippery material in a manner whereby leakage will be prevented.

It will be apparent, however, that various modifications and changes in the structures shown and described may be made by those skilled in the art without departing from the spirit of the invention as expressed in the accompanying claims. Therefore, all matter shown and described is to be interpreted as illustrative and not in a limiting sense.

What is claimed is:

1. A fitting for use with a sheetlike member, comprising a rigid shank of a length to provide respective end portions on either side of the sheetlike member when the shank is disposed through an aperture in the member, first restraining means on one end portion, second restraining means on the other end portion, a pair of compressible rings each mounted on said shank adjacent the inner side of a respective restraining means, and a pair of abrasive elements each mounted on said shank adjacent the inner side of a respective compressible ring, at least one of said restraining means being adjustable on the shank in a direction toward the other to position the abrasive members in close physical engagement with opposite sides of a sheetlike member therebetween.

2. A fitting as set forth in claim 1 wherein one of said restraining means is an integral enlarged portion of the shank, and the other restraining means is a nut.

3. A fitting as set forth in claim 1 wherein said abrasive elements are fabric impregnated with abrasive particles.

4. A fitting as set forth in claim 1 wherein said abrasive elements are emery cloth.

5. A fitting as set forth in claim 1 wherein said compressible rings are rubber and said abrasive elements are rings of emery cloth.

6. A fitting for use with a slippery sheetlike plastic member, comprising a rigid threaded shank of a length to provide respective end portions on either side of the sheetlike member when the shank is disposed through an aperture in the member, a fixed head on one end portion, a nut threadedly mounted on the other end portion, a pair of compressible rubber rings mounted on said shank, one ring being positioned adjacent the inner side of said head, the second ring being positioned adjacent the inner side of the nut, and a pair of abrasive elements each mounted on said shank adjacent the inner side of a respective compressible ring, the nut being adjustable on the shank in a direction toward the head to position the abrasive members in close physical engagement with opposite sides of a sheetlike member therebetween.

7. A fitting as set forth in claim 6 wherein said abrasive elements are fabric impregnated with abrasive particles.

8. A fitting as set forth in claim 6 wherein said abrasive elements are emery cloth.

9. A fitting for use with a slippery sheetlike plastic member, comprising a rigid threaded shank of a length to provide respective end portions on either side of the sheetlike member when the shank is disposed through an aperture in the member, a pair of nuts threadedly mounted on respective end portions, a pair of compressible rubber rings each mounted on said shank adjacent the inner side of a respective nut, and a pair of abrasive elements each mounted on said shank adjacent the inner side of a respective ring, said nuts being adjustable on the shank in a direction toward one another to position the abrasive members in close physical engagement with opposite sides of a sheetlike member therebetween.

10. A fitting as set forth in claim 9 wherein said abrasive elements are fabric impregnated with abrasive particles.

11. A fitting as set forth in claim 9 wherein said abrasive elements are emery cloth.

* * * * *